United States Patent
Nye

(10) Patent No.: US 10,061,990 B2
(45) Date of Patent: Aug. 28, 2018

(54) ENTITY DETECTION

(71) Applicant: Vivint, Inc., Provo, UT (US)

(72) Inventor: James Ellis Nye, Alpine, UT (US)

(73) Assignee: Vivint, Inc., Provo, UT (US)

( * ) Notice: Subject to any disclaimer, the term of this patent is extended or adjusted under 35 U.S.C. 154(b) by 0 days.

(21) Appl. No.: 15/589,730

(22) Filed: May 8, 2017

(65) Prior Publication Data

US 2017/0308758 A1  Oct. 26, 2017

Related U.S. Application Data

(63) Continuation of application No. 14/560,585, filed on Dec. 4, 2014, now Pat. No. 9,646,210.

(60) Provisional application No. 61/912,947, filed on Dec. 6, 2013.

(51) Int. Cl.
*G06K 9/00* (2006.01)
*H04N 7/18* (2006.01)

(52) U.S. Cl.
CPC ......... *G06K 9/00771* (2013.01); *H04N 7/183* (2013.01)

(58) Field of Classification Search
USPC ....... 382/100, 103–107, 155, 162, 168, 173, 382/181, 189, 199, 209, 219, 224, 232, 382/254, 274, 276, 286–291, 305, 312; 340/10.1; 348/148, 143
See application file for complete search history.

(56) References Cited

U.S. PATENT DOCUMENTS

| | | | |
|---|---|---|---|
| 2008/0018738 A1* | 1/2008 | Lipton | G06K 9/00771 348/143 |
| 2008/0100704 A1* | 5/2008 | Venetianer | G06F 17/3079 348/143 |
| 2009/0265106 A1* | 10/2009 | Bearman | G06Q 10/00 701/300 |
| 2010/0026802 A1* | 2/2010 | Titus | G08B 13/19608 348/143 |
| 2011/0133892 A1* | 6/2011 | Nohr | G07C 9/00111 340/10.1 |
| 2013/0113936 A1* | 5/2013 | Cohen | G07B 15/02 348/148 |

* cited by examiner

*Primary Examiner* — Seyed Azarian

(74) *Attorney, Agent, or Firm* — Holland & Hart LLP

(57) ABSTRACT

A computer-implemented method for entity detection is described. In one embodiment, an entity passing through a perimeter of a predefined area is detected via a camera. Upon detecting the entity passing through the perimeter of the predefined area, a type of the entity is classified from an image of the entity captured by the camera. Upon classifying the type of the entity, a feature of the entity is detected from the image of the entity. An identifier is assigned to the entity based on the type and the detected feature of the entity. The identifier distinguishes the entity from another entity of a same type.

18 Claims, 8 Drawing Sheets

ENTITY DETECTION

CROSS REFERENCE

This application is a continuation of U.S. patent application Ser. No. 14/560,585 entitled "ENTITY DETECTION," which was filed 4 Dec. 2014 and which claims the benefit of U.S. Provisional Patent Application No. 61/912,947 entitled "ENTITY DETECTION," which was filed 6 Dec. 2013, which are assigned to the assignee hereof. The disclosures of each of which are incorporated by reference herein in their entireties.

BACKGROUND

Advancements in media delivery systems and media-related technologies continue to increase at a rapid pace. Increasing demand for media has influenced the advances made to media-related technologies. Computer systems have increasingly become an integral part of the media-related technologies. Computer systems may be used to carry out several media-related functions. The wide-spread access to media has been accelerated by the increased use of computer networks, including the Internet and cloud networking.

Many homes and businesses use one or more computer networks to generate, deliver, and receive data and information between the various computers connected to computer networks. Users of computer technologies continue to demand increased access to information and an increase in the efficiency of these technologies. Improving the efficiency of computer technologies is desirable to those who use and rely on computers.

With the wide-spread use of computers and mobile devices has come an increased presence of home automation and home security products. Advancements in mobile devices allow users to monitor a home or business. These devices may provide tracking capabilities of people, vehicles, etc. Conventional devices that track/count different entities, however, do not provide accurate information.

SUMMARY

According to at least one embodiment, a computer-implemented method for entity detection is described. In one embodiment, an entity passing through a perimeter of a predefined area may be detected via a camera. Upon detecting the entity passing through the perimeter of the predefined area, a type of the entity may be classified from an image of the entity captured by the camera. Upon classifying the type of the entity, a feature of the entity may be detected from the image of the entity. An identifier may be assigned to the entity based on the type and the detected feature of the entity. The identifier may distinguish the entity from another entity of a same type.

In one embodiment, how many entities of the same type as the entity are located in the predefined area may be determined. A length of stay of the entity at the predefined area may be determined based on a detected time of arrival of the entity at the predefined area and a detected time of departure of the entity from the predefined area. The entity may be recognized based on the detected feature of the entity and whether the entity was assigned an identifier on a previous visit by the entity to the predefined area may be determined.

In one embodiment, an average length of stay of the entity at the predefined area may be determined based on the determined length of stay of the entity and a previously determined length of stay determined from the previous visit by the entity to the predefined area. Upon determining the entity was assigned an identifier on a previous visit, how many previous visits the entity has made to the predefined area may be determined. Upon determining how many previous visits the entity has made to the predefined area, an average rate of visits over a predetermined time period may be determined. A transaction by the entity at the predefined area may be associated with the identifier of the entity. An average value of transactions may be determined from the transaction and previous transactions associated with the identifier of the entity.

In one embodiment, the type of the entity may be identified as a vehicle, the predefined area being a parking lot. A type of a second entity exiting the vehicle may be identified as a human. A location of the second entity may be tracked and monitored, and whether the second entity enters a second predefined area may be determined. A notification may be generated in response to detecting one or more of the features described above.

A computing device configured to obscure content on a screen is also described. The device may include a processor and memory in electronic communication with the processor. The memory may store instructions that may be executable by the processor to detect, via a camera, an entity passing through a perimeter of a predefined area and classify, upon detecting the entity passing through the perimeter of the predefined area, a type of the entity from an image of the entity captured by the camera. The memory may store instructions that may be executable by the processor to detect, upon classifying the type of the entity, a feature of the entity from the image of the entity, and assign an identifier to the entity based at least in part on the type and the detected feature of the entity. The identifier may distinguish the entity from another entity of a same type.

A computer-program product to obscure content on a screen is also described. The computer-program product may include a non-transitory computer-readable medium that stores instructions. The instructions may be executable by the processor to detect, via a camera, an entity passing through a perimeter of a predefined area and classify, upon detecting the entity passing through the perimeter of the predefined area, a type of the entity from an image of the entity captured by the camera. The memory may store instructions that may be executable by the processor to detect, upon classifying the type of the entity, a feature of the entity from the image of the entity, and assign an identifier to the entity based at least in part on the type and the detected feature of the entity. The identifier may distinguish the entity from another entity of a same type.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
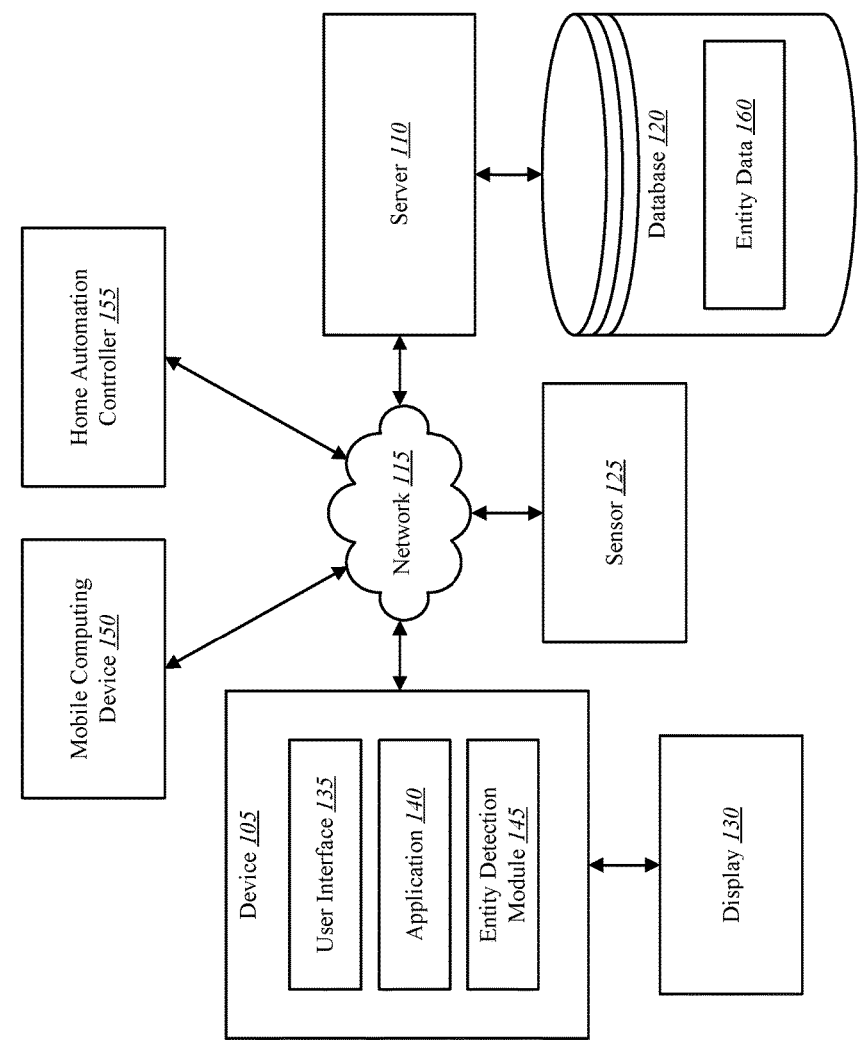
FIG. 1 is a block diagram illustrating one embodiment of an environment in which the present systems and methods may be implemented.

While the embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION

The systems and methods described herein relate to home automation. More specifically, the systems and methods described herein relate to entity detection in relation to a home automation system. In one example, a user may desire to receive an alert when someone enters a predefined area. For instance, a shop owner may want to know when a person enters or leaves through a doorway. Presently, a sensor may detect when an object disrupts a beam sensor (e.g., infrared (IR) beam sensor, etc.) associated with the door of the shop. Upon detecting an object passing through the IR beam, a chime may sound. The shop owner, however, may have to actively monitor the shop to know whether a person has passed through the beam sensor, or to know how many people have entered and/or exited the shop. The present systems and methods detect when a person passes through a predetermined perimeter and generate a notification upon detecting one or more conditions being satisfied in relation to detecting a person passing through the predetermined perimeter. Moreover, the systems and methods described herein may provide entity detection, customer recognition, object recognition, querying customer-related data in relation to recognizing the customer, and generating notifications in relation to detecting an entity and/or identifying the type of entity (e.g., vehicles, humans, animals, etc.).

FIG. 1 is a block diagram illustrating one embodiment of an environment 100 in which the present systems and methods may be implemented. In some embodiments, the systems and methods described herein may be at least partially performed on a device (e.g., device 105). The environment 100 may include a device 105, server 110, a sensor 125, a display 130, a mobile computing device 150, a home automation controller 155, and a network 115 that allows the device 105, the server 110, the mobile computing device 150, home automation controller 155, and sensor 125 to communicate with one another. Examples of the device 105 include media content set top box, satellite set top box, cable set top box, DVRs, personal video recorders (PVRs), mobile devices, smart phones, personal computing devices, computers, servers, etc. Examples of the home automation controller 155 include a dedicated home automation computing device (e.g., wall-mounted controller), a personal computing device (e.g., laptop, desktop, etc.), a mobile computing device (e.g., tablet computing device, smartphone, etc.), and the like.

Examples of sensor 125 include a camera sensor, audio sensor, proximity sensor, boundary sensor, light beam sensor, three-dimensional (3-D) sensor, motion sensor, door sensor, window sensor, accelerometer, global positioning system (GPS) sensor, Wi-Fi positioning system sensor, capacitance sensor, radio frequency sensor, near-field sensor, voice sensor, and the like. Sensor 125 may represent one or more separate sensors or a combination of two or more sensors in a single device. For example, sensor 125 may represent one or more camera sensors and one or more motion sensors connected to environment 100. Additionally, or alternatively, sensor 125 may represent a combination sensor such as both a camera sensor and a motion sensor integrated in the same device. Sensor 125 may be integrated with a facial recognition system. Although sensor 125 is depicted as connecting to device 105 over network 115, in some embodiments, sensor 125 may connect directly to device 105. Additionally, or alternatively, sensor 125 may be integrated with a home appliance or fixture such as a light bulb fixture. Sensor 125 may include an accelerometer to enable sensor 125 to detect a movement. For example, sensor 125 may be attached to an item in a grocery store carried by a patron of the grocery store (e.g., shopping cart, item to be purchased, etc.). Sensor 125 may include a wireless communication device enabling sensor 125 to send and receive data and/or information to and from one or more devices in environment 100. Additionally, or alternatively, sensor 125 may include a GPS sensor to enable sensor 125 to track a location of sensor 125. Sensor 125 may include a proximity sensor to enable sensor to detect a proximity of a person relative to an object to which the sensor is attached and/or associated.

In some configurations, the device 105 may include a user interface 135, application 140, and entity detection module 145. Although the components of the device 105 are depicted as being internal to the device 105, it is understood that one or more of the components may be external to the device 105 and connect to device 105 through wired and/or wireless connections. In some embodiments, application 140 may be installed on mobile computing device 150 in order to allow a user to interface with a function of device 105, entity detection module 145, home automation controller 155, and/or server 110.

In some embodiments, device 105 may communicate with server 110 via network 115. Examples of networks 115 include cloud networks, local area networks (LAN), wide area networks (WAN), virtual private networks (VPN), wireless networks (using 802.11, for example), cellular networks (using 3G and/or LTE, for example), Z-Wave networks, etc. In some configurations, the network 115 may include the internet. It is noted that in some embodiments, the device 105 may not include a entity detection module 145. For example, device 105 may include application 140 that allows device 105 to interface with home automation controller 155 via entity detection module 145 located on another device such as mobile computing device 150 and/or server 110.

In some embodiments, device 105, home automation controller 155, and server 110 may include a entity detection module 145 where at least a portion of the functions of entity detection module 145 are performed separately and/or concurrently on device 105, home automation controller 155, and/or server 110. Likewise, in some embodiments, a user may access the functions of device 105 and/or home automation controller 155 (directly or through device 105 via entity detection module 145) from mobile computing device 150. For example, in some embodiments, mobile computing device 150 includes a mobile application that interfaces with one or more functions of device 105, home automation controller 155, entity detection module 145, and/or server 110. In some embodiments, at least a portion of the functions of the entity detection module 145 may execute on one or more devices located in a cloud network, including any one of the devices illustrated in FIG. 1. For example, one or more computing devices may connect to and communicate with a home automation controller in a home over a cloud network. Thus, one or more functions of the entity detection module 145 may be performed on one or more devices in a cloud network. Performance of the function by the one or more devices in the cloud network may include interacting, controlling an aspect of, and/or communicating with one or more devices in the home via the home automation controller.

In some embodiments, server 110 may be coupled to database 120. Database 120 may include entity data 160 and other information related to a predefined area. For example, device 105 may access entity data 160 in database 120 over network 115 via server 110. Database 120 may be internal or external to the server 110. In one example, device 105 may be coupled directly to database 120, database 120 being internal or external to device 105. Entity data may include information regarding an identifier assigned to an entity, information regarding entity types (e.g., person, vehicle, animal, etc.), detected features of entities, feature detection signatures, transaction data (e.g., transaction amount, merchandise purchased, average transactions per month, total number of transactions, etc.), average time an entity spends at a predefined area (e.g., time spent in a shop, at a restaurant, a business, etc.).

Entity detection module 145 may allow a user to track an entity in a predefined space. For example, entity detection module 145 may track a vehicle in a parking lot. Additionally, or alternatively, entity detection module 145 may track a user exiting the vehicle, entering a predefined area (e.g., a place of business), and logging information regarding a visit by the detected entity. Entities may include both animate objects such as persons and animals, inanimate objects under the control of animate objects such as modes of transportation (e.g., vehicles, buses, trains, motorbikes, bicycles, etc.), and simply inanimate objects.

Figure 2:
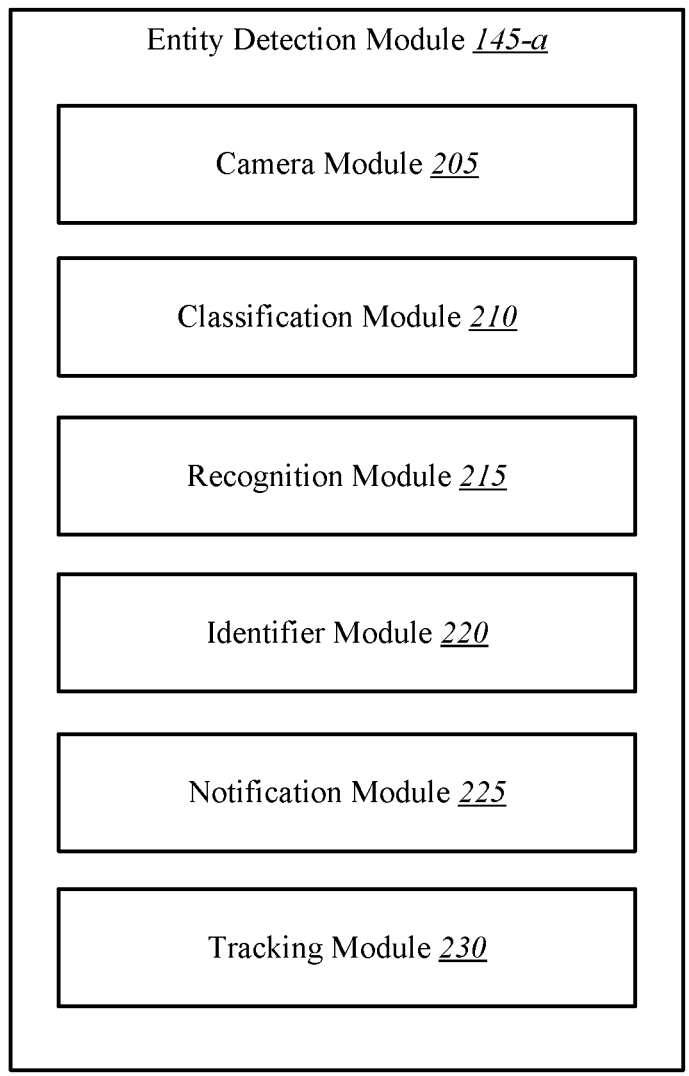
FIG. 2 is a block diagram illustrating one example of a entity detection module.

FIG. 2 is a block diagram illustrating one example of a entity detection module 145-*a*. Entity detection module 145-*a* may be one example of entity detection module 145 depicted in FIG. 1. As depicted, entity detection module 145-*a* may include camera module 205, classification module 210, recognition module 215, identifier module 220, notification module 225, and tracking module 230.

In one embodiment, the camera module 205 may detect, in conjunction with a camera, an entity passing through a perimeter of a predefined area. The predefined area may include a shop, a restaurant, a building, an area of the building, a home, an area of the home, a parking lot, an animal cage, a wilderness area, and the like. Upon detecting the entity passing through the perimeter of the predefined area, classification module 210 may classify a type of the entity from an image of the entity captured by the camera. Several different types of entities may be registered in a database. Types may include a vehicle, a human, an animal, animate objects, inanimate objects, etc. The types may include sub-types such as sub-types of vehicles (e.g., car, truck, sedan, coupe, make, model, etc.), sub-types of humans (e.g., child, teenager, adult, senior adult, etc.), sub-types of animals (e.g., dog, cat, sheep, wolf, etc.), and so forth. Upon classifying the type of the entity, recognition module 215 may detect one or more features of the entity from the image of the entity. The detected features may be used by the system to distinguish one entity from another. In some cases, identifier module 220 may assign an identifier to the entity based on the type and the detected feature of the entity. The identifier may be used to distinguish the entity from another entity of a same type. For example, one person standing in a shop may be assigned a first identifier and a second person standing in the shop may be assigned a second identifier, where both the first and second identifiers are identifiers associated with people. Additionally, or alternatively, the identifier may be used to store information regarding the visit of the entity in a database.

In some embodiments, an entry in the database may store this information and may include the identifier. Thus, information regarding the entity may be queried and retrieved based on a search using the assigned identifier. The identifier may include a string of characters that the system uses to store information associated with the entity. In order to address privacy concerns, in some embodiments, the data associated with a human-type entity (e.g., a person) may exclude information that reveals the actual identity of the entity such as name, address, telephone number, credit card number, social security number, and any other contact information related to the actual identity of the person.

Upon detecting the entity, notification module 225 may generate a notification indicating information regarding the detection of the entity. For example, the classification module 210 may classify one entity as a person and a second entity as an animal. For example, a veterinarian may receive a first notification indicating that a person has entered the clinic, and may receive a second notification indicating that a second person has entered the clinic with an animal in tow.

Tracking module 230 may determine how many entities of the same type as the detected entity are located in the predefined area. For example, tracking module may determine that five persons remain in an area of a shop. Upon detecting the number of entities in the predefined area, notification module 225 may generate a notification indicating the number of entities in the predefined area. Tracking module 230 may determine a length of stay of the entity at the predefined area based on a detected time of arrival of the entity at the predefined area and a detected time of departure of the entity from the predefined area.

In one embodiment, recognition module 215 may recognize the entity, based on the detected feature of the entity. For example, recognition module 215 may recognize a visual feature (e.g., facial recognition, etc.), an audio feature (e.g., voice recognition), a character feature (character recognition identifying characters on a license plate, for example), a device identifier of a mobile device predetermined to be associated with the entity, and the like.

Upon recognizing the entity, notification module 225 may generate a notification indicating the recognized entity. For example, a person may want to know when a particular person arrives at a certain area, such as a preferred customer arriving at a shop. In some embodiments, identifier module 220 may determine whether the recognized entity was assigned an identifier on a previous visit to the predefined area. If the entity was previously assigned an identifier, then information regarding the current visit of the entity may be stored in a database entry associated with the previously assigned identifier. Thus, the detected feature of the entity may be compared to one or more predefined features stored in a database. Upon matching the detected feature to one or more of the predefined features stored in the database, the identifier module 220 may determine whether the entity was previously assigned an identifier. Previously acquired data and information regarding the recognized entity may be stored in a database entry according to an identifier previously assigned to the entity.

In one embodiment, tracking module 230 may determine an average length of stay of the entity at the predefined area and a previously determined length of stay determined from the previous visit by the entity to the predefined area. Upon determining the entity was assigned an identifier on a previous visit, tracking module 230 may determine how many previous visits the entity has made to the predefined area. Upon determining how many previous visits the entity has made to the predefined area, tracking module 230 may determine an average rate of visits over a predetermined time period. Upon determining information regarding visits made by the entity, notification module 225 may generate a notification indicating information regarding the visits.

In some embodiments, tracking module 230 may associate, with the identifier of the entity, a transaction performed by the entity at the predefined area. Thus, transactions of a person at a store may be tracked and associated with particular customer. As explained above, privacy concerns may be addressed by storing only non-identifying information regarding the entity, where the assigned identifier is a string of characters generated by the system and not based on private information of the entity (e.g., name, address, phone number, credit card number, social security number, driver license number, etc.). Tracking module 230 may determine an average value of transactions from the transaction and previous transactions associated with the identifier of the entity.

In one example, classification module 205 may identify the type of the entity as a vehicle, the predefined area being a parking lot. Classification module 205 may identify a type of a second entity exiting the vehicle as a human. Tracking module 230 may track a location of the second entity, i.e., the person exiting the vehicle. Tracking module 230 may track where the person goes after exiting the vehicle. For example, tracking module 230 may determine whether the person enters a particular shop after parking in the parking lot of the shop. The parking lot may include signs that are posted to provide notification that only customers of this particular shop may park in the parking lot. Upon determining that the person does not patronize the shop after parking in this parking lot, notification module 225 may generate a notification alerting the shop that a non-customer is parked in their parking lot.

Figure 3:
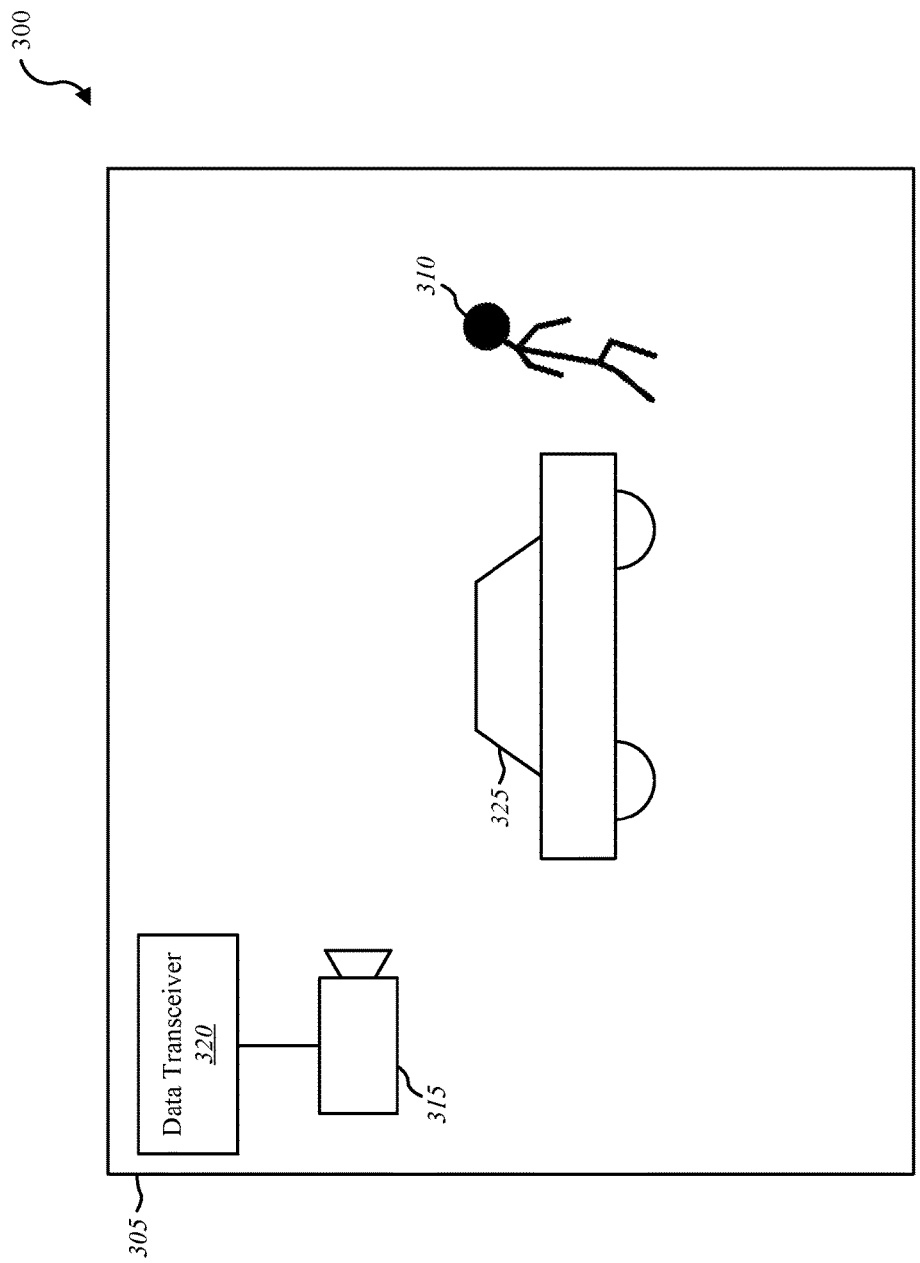
FIG. 3 is a block diagram illustrating one example of an environment for detecting an entity at a predefined area.

FIG. 3 is a block diagram illustrating one example of an environment 300 for detecting an entity at a predefined area 305. As depicted, the predefined area 305 may include a person 310, a camera 315, a data transceiver 320, and a vehicle 325. Camera 315 may communicate with entity detection module 145 via data transceiver 320.

In some embodiments, predefined area 305 may include a parking area such as a parking lot or parking garage. For example, camera 315, in conjunction with entity detection module 145, may detect an entity arriving at a parking area. The entity may be identified as a vehicle. Thus, in addition to detecting the vehicle, the one or more entities exiting the vehicle may be identified as people.

As described above, entity detection module 145 may allow a user to count the number of entities within a predefined area. Thus, camera 315 may allow entity detection module 145 to count the number of vehicles in a parking area. Additionally, or alternatively, camera 315 may allow entity detection module 145 to count the number of persons in a predefined area.

Figure 4:
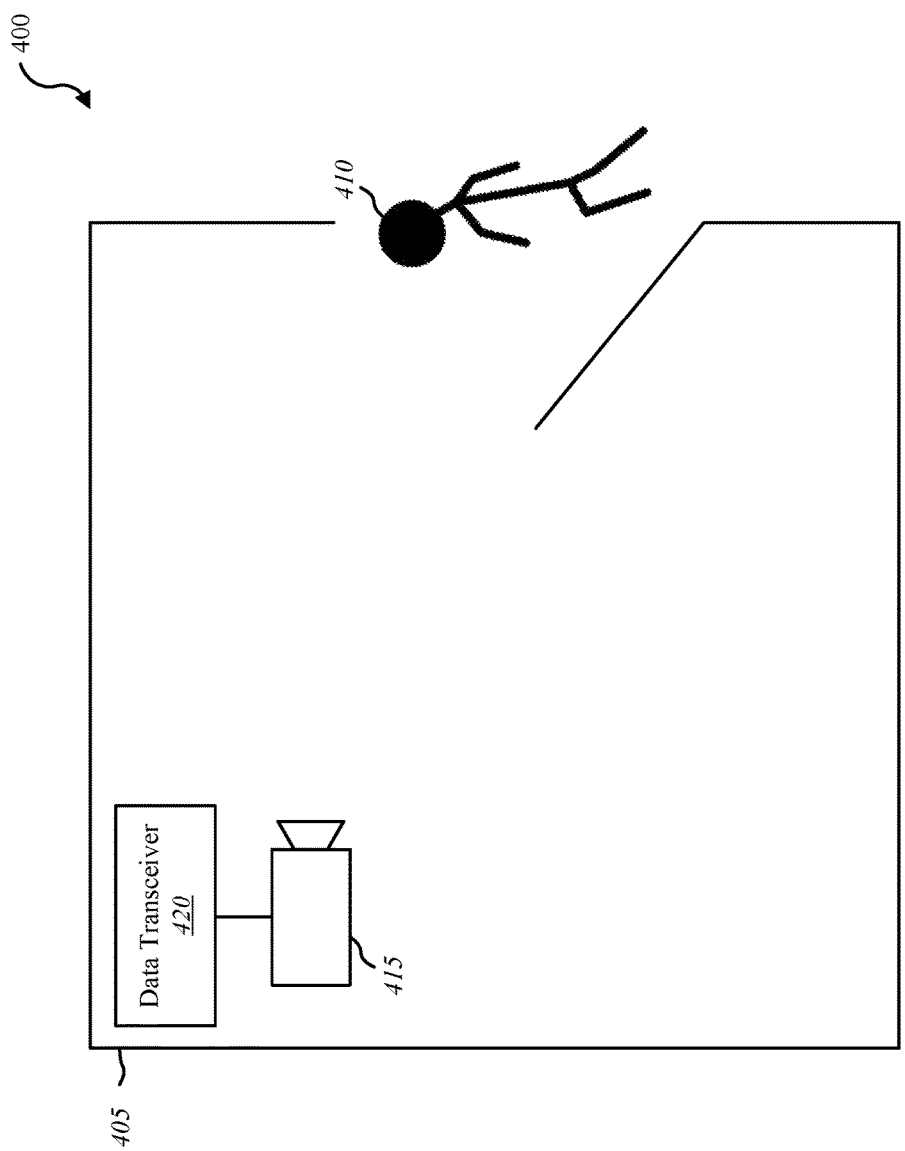
FIG. 4 is a block diagram illustrating another example of an environment for detecting an entity at a predefined area.

FIG. 4 is a block diagram illustrating another example of an environment 400 for detecting an entity at a predefined area 405. Environment 400 may include a predefined area 405, a person 410, a camera 415, and data transceiver 420. Camera 415 may communicate with entity detection module 145 via data transceiver 420.

In some embodiments, predefined area 405 may include a place of business such as a restaurant, a shop, a waiting area of a customer, client, and/or patient, etc. For example, camera 415, in conjunction with entity detection module 145, may detect an entity arriving at shop. The arriving entity may be identified as a person. Camera 415 may allow entity detection module 145 to count the number of persons in the shop. As described above, the person may purchase an item from the shop. Having assigned an identifier to the person, data regarding the transaction by the person may be recorded in a database. Additionally, or alternatively, the assigned identifier, identifying characteristics, and/or data regarding the visit may be recorded in a database. Thus, in one example, entity detection module 145 may detect the person arriving in a vehicle. An identifying characteristic of the vehicle may be detected (e.g., model, make, license plate number, etc.), and it may be determined that the vehicle has already been assigned an identifier. Accordingly, information regarding earlier visits may be queried. It may be determined that the person is a preferred customer. A shop owner may receive a notification regarding the arrival of a preferred customer. In another example, the data may indicate that the user on a previous visit parked in the shop's private parking lot, but never patronized the shop, despite posted signs that indicate that the parking is only for customers of the shop. Accordingly, the shop owner may receive notifications regarding the arrival of a non-patronizing user of the parking area.

Figure 5:
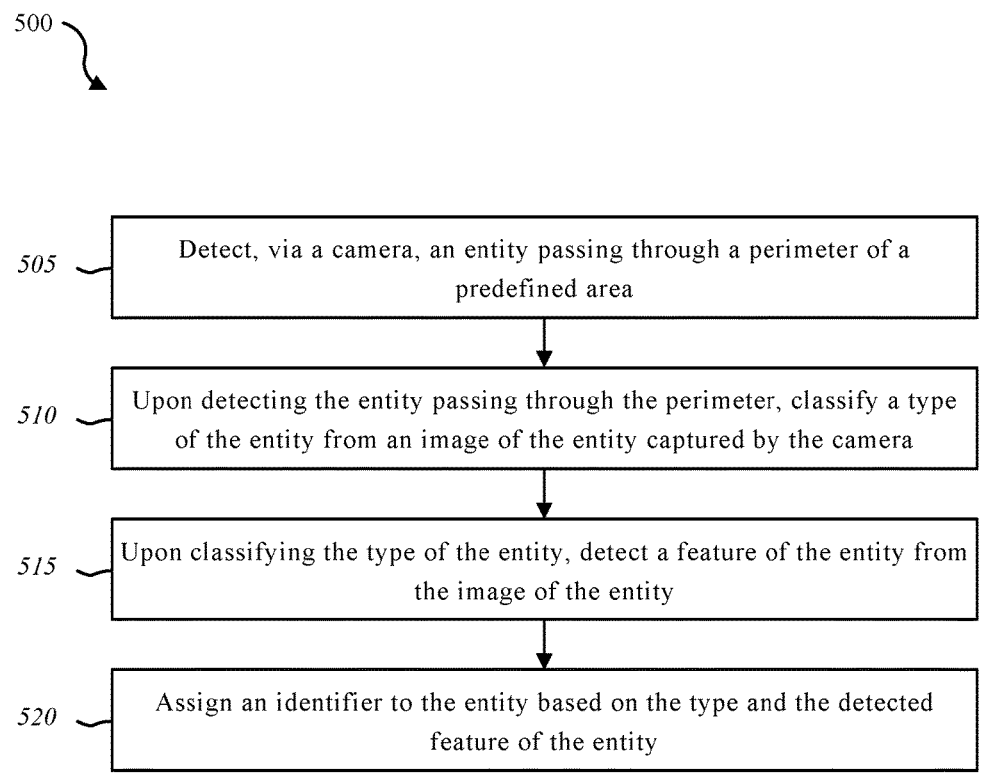
FIG. 5 is a flow diagram illustrating one embodiment of a method for detecting an entity at a predefined area.

FIG. 5 is a flow diagram illustrating one embodiment of a method 500 for detecting an entity at a predefined area. In some configurations, the method 500 may be implemented by the entity detection module 145 illustrated in FIGS. 1 and/or 2. In some configurations, the method 500 may be implemented in conjunction with the application 140 and/or the user interface 135 illustrated in FIG. 1.

At block 505, an entity passing through a perimeter of a predefined area may be detected via a camera. At block 510, upon detecting the entity passing through the perimeter of the predefined area, a type of the entity may be classified from an image of the entity captured by the camera. At block 515, upon classifying the type of the entity, a feature of the entity may be detected from the image of the entity. At block 520, an identifier may be assigned to the entity based on the type and the detected feature of the entity. The identifier may distinguish the entity from another entity of a same type.

Figure 6:
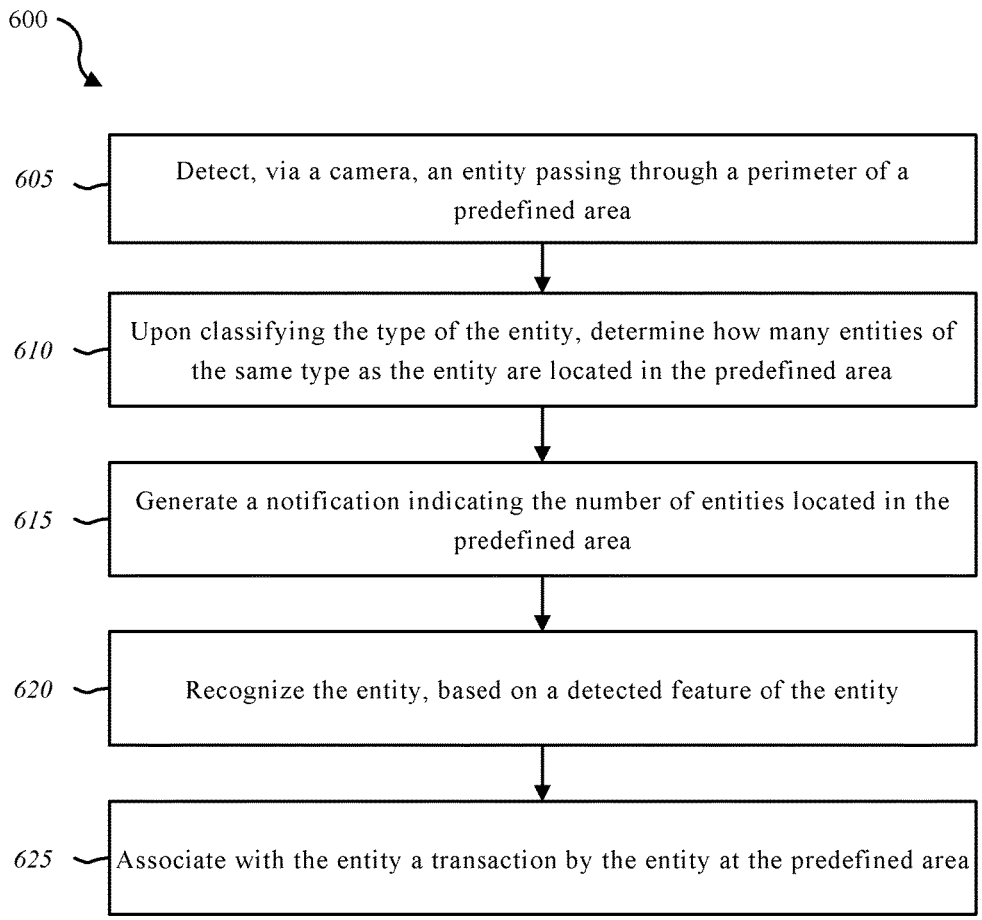
FIG. 6 is a flow diagram illustrating one embodiment of a method for generating a notification upon satisfying a predetermined condition.

FIG. 6 is a flow diagram illustrating one embodiment of a method 600 for generating a notification upon satisfying a predetermined condition. In some configurations, the method 600 may be implemented by the entity detection module 145 illustrated in FIGS. 1 and/or 2. In some configurations, the method 600 may be implemented in conjunction with the application 140 and/or the user interface 135 illustrated in FIG. 1.

At block 605, an entity passing through a perimeter of a predefined area may be detected via a camera. At block 610, upon classifying the type of the entity, it may be determined how many entities of the same type as the entity are located in the predefined area. At block 615, a notification indicating the number of entities located in the predefined area may be generated. At block 620, the entity may be recognized based on a detected feature of the entity (e.g., facial recognition, voice recognition, etc.). At block 625, a transaction initiated by the entity at the predefined area may be associated with the entity.

Figure 7:
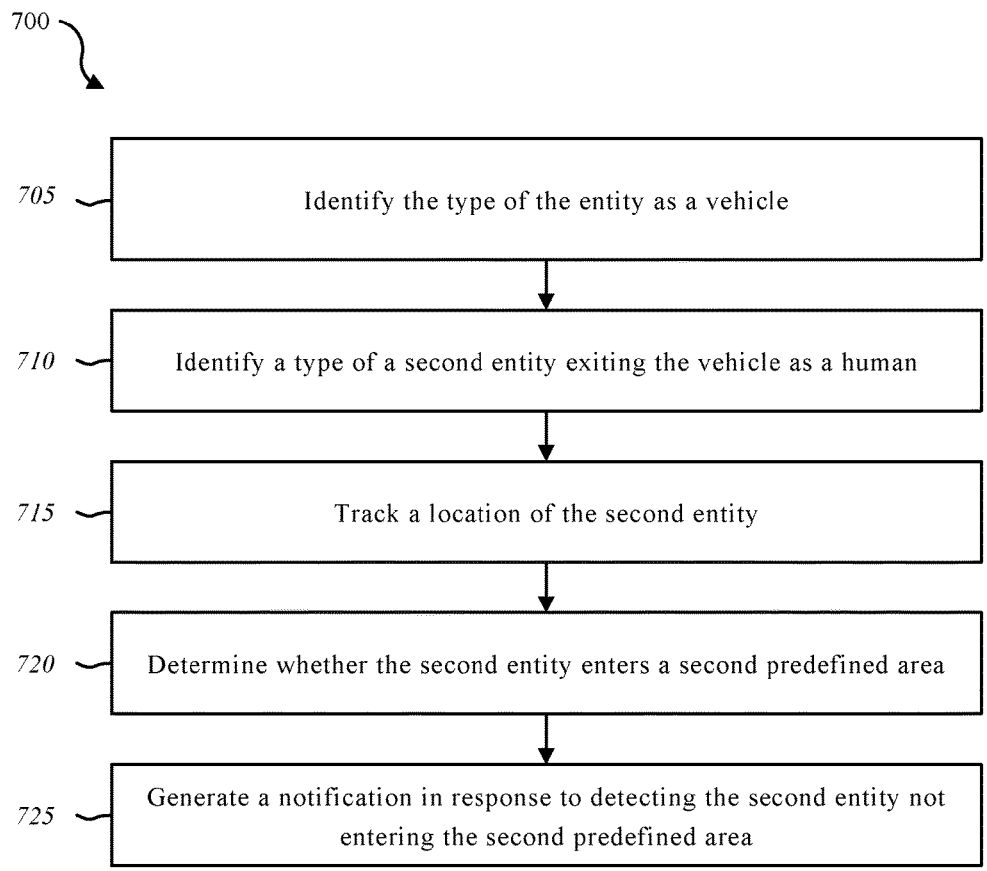
FIG. 7 is a flow diagram illustrating one embodiment of a method for tracking a person relative to a vehicle.

FIG. 7 is a flow diagram illustrating one embodiment of a method 700 for tracking a person relative to a vehicle. In some configurations, the method 700 may be implemented by the entity detection module 145 illustrated in FIGS. 1 and/or 2. In some configurations, the method 700 may be implemented in conjunction with the application 140 and/or the user interface 135 illustrated in FIG. 1.

At block 705, the type of the entity may be identified as a vehicle. At block 710, a type of a second entity exiting the vehicle may be identified as a human. At block 715, a location of the second entity may be tracked. At block 720, it may be determined whether the second entity enters a second predefined area. At block 725, a notification may be generated in response to detecting the second entity not entering the second predefined area.

Figure 8:
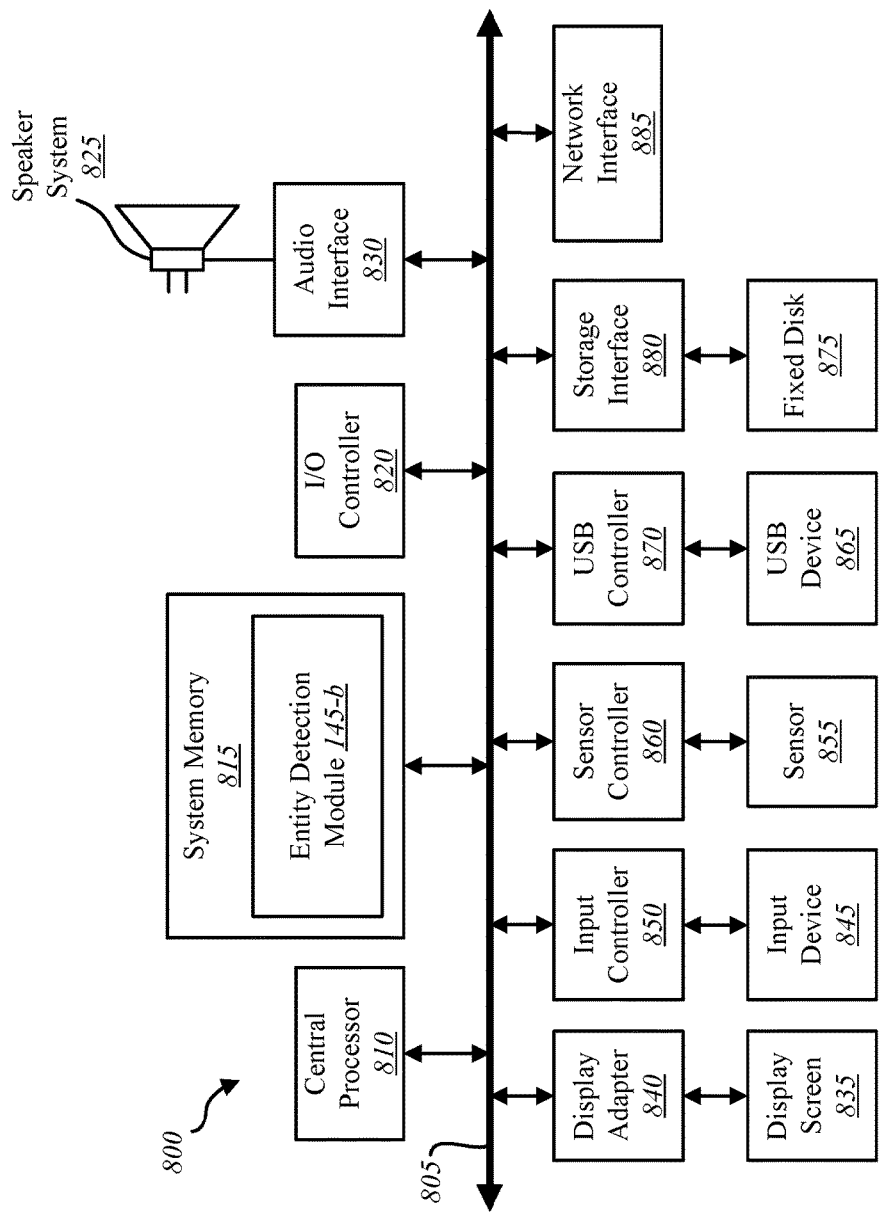
FIG. 8 depicts a block diagram of a computer system suitable for implementing the present systems and methods.

FIG. 8 depicts a block diagram of a controller 800 suitable for implementing the present systems and methods. The controller 800 may be an example of the set top box device 105, mobile computing device 150, and/or home automation controller 155 illustrated in FIG. 1. In one configuration, controller 800 includes a bus 805 which interconnects major subsystems of controller 800, such as a central processor 815, a system memory 820 (typically RAM, but which may also include ROM, flash RAM, or the like), an input/output controller 825, an external audio device, such as a speaker system 830 via an audio output interface 835, an external device, such as a display screen 835 via display adapter 840, an input device 845 (e.g., remote control device interfaced with an input controller 850), multiple USB devices 865 (interfaced with a USB controller 870), and a storage interface 880. Also included are at least one sensor 855 connected to bus 805 through a sensor controller 860 and a network interface 885 (coupled directly to bus 805).

Bus 805 allows data communication between central processor 815 and system memory 820, which may include read-only memory (ROM) or flash memory (neither shown), and random access memory (RAM) (not shown), as previously noted. The RAM is generally the main memory into which the operating system and application programs are loaded. The ROM or flash memory can contain, among other code, the Basic Input-Output system (BIOS) which controls basic hardware operation such as the interaction with peripheral components or devices. For example, the entity detection module 145-*b* to implement the present systems and methods may be stored within the system memory 820. Applications (e.g., application 140) resident with controller 800 are generally stored on and accessed via a non-transitory computer readable medium, such as a hard disk drive (e.g., fixed disk 875) or other storage medium. Additionally, applications can be in the form of electronic signals modulated in accordance with the application and data communication technology when accessed via interface 885.

Storage interface 880, as with the other storage interfaces of controller 800, can connect to a standard computer readable medium for storage and/or retrieval of information, such as a fixed disk drive 875. Fixed disk drive 875 may be a part of controller 800 or may be separate and accessed through other interface systems. Network interface 885 may provide a direct connection to a remote server via a direct network link to the Internet via a POP (point of presence). Network interface 885 may provide such connection using wireless techniques, including digital cellular telephone connection, Cellular Digital Packet Data (CDPD) connection, digital satellite data connection, or the like. In some embodiments, one or more sensors (e.g., motion sensor, smoke sensor, glass break sensor, door sensor, window sensor, carbon monoxide sensor, and the like) connect to controller 800 wirelessly via network interface 885.

Many other devices or subsystems (not shown) may be connected in a similar manner (e.g., entertainment system, computing device, remote cameras, wireless key fob, wall mounted user interface device, cell radio module, battery, alarm siren, door lock, lighting system, thermostat, home appliance monitor, utility equipment monitor, and so on). Conversely, all of the devices shown in FIG. 8 need not be present to practice the present systems and methods. The devices and subsystems can be interconnected in different ways from that shown in FIG. 8. The aspect of some operations of a system such as that shown in FIG. 8 are readily known in the art and are not discussed in detail in this application. Code to implement the present disclosure can be stored in a non-transitory computer-readable medium such as one or more of system memory 820 or fixed disk 875. The operating system provided on controller 800 may be iOS®, ANDROID®, MS-DOS®, MS-WINDOWS®, OS/2®, UNIX®, LINUX®, or another known operating system.

Moreover, regarding the signals described herein, those skilled in the art will recognize that a signal can be directly transmitted from a first block to a second block, or a signal can be modified (e.g., amplified, attenuated, delayed, latched, buffered, inverted, filtered, or otherwise modified) between the blocks. Although the signals of the above described embodiment are characterized as transmitted from one block to the next, other embodiments of the present systems and methods may include modified signals in place of such directly transmitted signals as long as the informational and/or functional aspect of the signal is transmitted between blocks. To some extent, a signal input at a second block can be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Furthermore, while various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the present systems and methods and their practical applications, to thereby enable others skilled in the art to best utilize the present systems and methods and various embodiments with various modifications as may be suited to the particular use contemplated.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising." In addition, the term "based on" as used in the specification and the claims is to be construed as meaning "based at least upon."

What is claimed is:

1. A method for entity detection, comprising:
   detecting, using a camera and a controller, that a vehicle is positioned in a first predefined area of a parking lot based at least in part on camera data;
   determining, using the controller, that a human is associated with the vehicle based at least in part on detecting the vehicle;
   determining, using the camera and the controller, whether the human associated with the vehicle enters a second predefined area different from the first predefined area while the vehicle is positioned in the first predefined area;
   tracking, using the camera and the controller, a location of the human relative to the first predefined area for a predetermined length of time since an arrival of the vehicle in the first predefined area; and
   transmitting, using the controller, a first notification to a device associated with the second predefined area based at least in part on the location of the human relative to the second predefined area while the vehicle is positioned in the first predefined area, a time since the arrival of the vehicle exceeding the predetermined length of time, and the tracking.

2. The method of claim 1, further comprising:
   identifying that the human exits the vehicle after the vehicle enters the first predefined area based at least in part on the camera data, wherein identifying that the human is associated with the vehicle is based at least in part on identifying that the human exits the vehicle.

3. The method of claim 1, further comprising:
   determining that the human does not enter the second predefined area, wherein transmitting the first notification is based at least in part on determining that the human does not enter the second predefined area while the vehicle is positioned in the first predefined area.

4. The method of claim 1, further comprising:
   recognizing the human as it passes through a perimeter of the first predefined area based at least in part on one or more features of the human; and
   transmitting a second notification to the device based at least in part on recognizing the human.

5. The method of claim 4, wherein the second notification includes information related to the human and is transmitted before the human enters the second predefined area.

6. The method of claim 4, further comprising:
   detecting the one or more features of the human based at least in part on the camera data, wherein recognizing the human is based at least in part on the detecting.

7. The method of claim 4, further comprising:
   determining an average length of stay of the human at the second predefined area based at least in part on at least one length of stay of a previous visit of the human at the second predefined area, wherein the second notification includes an indication of the average length of stay of the human.

8. The method of claim 4, further comprising:
   determining a number of previous visits made by the human to the second predefined area, wherein the second notification includes an indication of the number of previous visits.

9. The method of claim 1, further comprising:
   receiving the camera data from the camera positioned to observe the first predefined area and the second predefined area.

10. The method of claim 1, wherein:
    the first predefined area of the parking lot is reserved for use by humans that enter the second predefined area.

11. An apparatus for entity detection, comprising:
    a camera; and
    a controller comprising a processor and memory in electronic communication with the processor, and instructions stored in the memory and operable, when executed by the processor, to cause the apparatus to:
    detect, using the camera and the controller, that a vehicle is positioned in a first predefined area of a parking lot based at least in part on camera data;
    determine, using the controller, that a human is associated with the vehicle based at least in part on detecting the vehicle;
    determine, using the camera and the controller, whether the human associated with the vehicle enters a second predefined area different from the first predefined area while the vehicle is positioned in the first predefined area;
    track, using the camera and the controller, a location of the human relative to the first predefined area for a predetermined length of time since an arrival of the vehicle in the first predefined area; and
    transmit, using the controller, a first notification to a device associated with the second predefined area based at least in part on the location of the human relative to the second predefined area while the vehicle is positioned in the first predefined area, a time since the arrival of the vehicle exceeding the predetermined length of time, and the tracking.

12. The apparatus of claim 11, wherein the instructions are further executable by the processor to:
  identify that the human exits the vehicle after the vehicle enters the first predefined area based at least in part on the camera data, wherein identifying that the human is associated with the vehicle is based at least in part on identifying that the human exits the vehicle.

13. The apparatus of claim 11, wherein the instructions are further executable by the processor to:
  determine that the human does not enter the second predefined area, wherein transmitting the first notification is based at least in part on determining that the human does not enter the second predefined area while the vehicle is positioned in the first predefined area.

14. The apparatus of claim 11, wherein the instructions are further executable by the processor to:
  recognize the human as it passes through a perimeter of the first predefined area based at least in part on a one or more features of the human; and
  transmit a second notification to the device based at least in part on recognizing the human.

15. The apparatus of claim 14, wherein the second notification includes information related to the human and is transmitted before the human enters the second predefined area.

16. A non-transitory computer readable medium storing code for entity detection, the code comprising instructions executable by a processor to:
  detect, using a camera and a controller, that a vehicle is positioned in a first predefined area of a parking lot based at least in part on camera data;
  determine, using the controller, that a human is associated with the vehicle based at least in part on detecting the vehicle;
  determine, using the camera and the controller, whether the human associated with the vehicle enters a second predefined area different from the first predefined area while the vehicle is positioned in the first predefined area;
  track, using the camera and the controller, a location of the human relative to the first predefined area for a predetermined length of time since an arrival of the vehicle in the first predefined area; and
  transmit, using the controller, a first notification to a device associated with the second predefined area based at least in part on the location of the human relative to the second predefined area while the vehicle is positioned in the first predefined area, a time since the arrival of the vehicle exceeding the predetermined length of time, and the tracking.

17. The non-transitory computer-readable medium of claim 16, wherein the instructions are further executable by the processor to:
  identify that the human exits the vehicle after the vehicle enters the first predefined area based at least in part on the camera data, wherein identifying that the human is associated with the vehicle is based at least in part on identifying that the human exits the vehicle.

18. The non-transitory computer-readable medium of claim 16, wherein the instructions are further executable by the processor to:
  determine that the human does not enter the second predefined area, wherein transmitting the first notification is based at least in part on determining that the human does not enter the second predefined area while the vehicle is positioned in the first predefined area.

* * * * *